(12) United States Patent
Peña et al.

(10) Patent No.: US 9,180,364 B2
(45) Date of Patent: Nov. 10, 2015

(54) GAME CONTROLLER ADAPTED FOR USE BY MOBILITY IMPAIRED PERSONS

(75) Inventors: Luis Peña, Casa Grande, AZ (US);
David Aitchison, Phoenix, AZ (US);
Barry Robb, Scottsdale, AZ (US);
Jung-Yun Lee, Tempe, AZ (US);
Hermann A. Hofer, Phoenix, AZ (US);
Kaylin Winkelmann, Casa Grande, AZ (US)

(73) Assignee: LP ACCESSIBLE TECHNOLOGIES, LLC, Case Grande, AZ (US)

( * ) Notice: Subject to any disclaimer, the term of this patent is extended or adjusted under 35 U.S.C. 154(b) by 16 days.

(21) Appl. No.: 13/445,495

(22) Filed: Apr. 12, 2012

(65) Prior Publication Data

US 2013/0012322 A1    Jan. 10, 2013

Related U.S. Application Data

(60) Provisional application No. 61/474,738, filed on Apr. 12, 2011.

(51) Int. Cl.
*A63F 9/24*        (2006.01)
*A63F 13/98*       (2014.01)

(52) U.S. Cl.
CPC .......... *A63F 13/02* (2013.01); *A63F 2300/1025* (2013.01); *A63F 2300/1043* (2013.01); *A63F 2300/1062* (2013.01)

(58) Field of Classification Search
CPC .......... A63F 13/80; A63F 13/45; A63F 13/40
USPC .......................................................... 463/36
See application file for complete search history.

(56) References Cited

U.S. PATENT DOCUMENTS

| | | | |
|---|---|---|---|
| 6,288,706 B1* | 9/2001 | Leman | 345/168 |
| 7,758,424 B2* | 7/2010 | Riggs et al. | 463/37 |
| 7,828,157 B2* | 11/2010 | Thorsen | 211/26.2 |
| 2008/0191415 A1 | 8/2008 | Arche et al. | |
| 2011/0306425 A1* | 12/2011 | Rivard et al. | 463/37 |
| 2012/0322558 A1* | 12/2012 | Tiley et al. | 463/37 |

FOREIGN PATENT DOCUMENTS

WO    00/67865 A1    11/2000

OTHER PUBLICATIONS

Intl. Search Report/Written Opinion dated Jan. 4, 2013 of PCT/US2012/033294 filed Apr. 12, 2012 (13 pages).
International Preliminary Report on Patentability dated Oct. 24, 2013 of PCT/US2012/033294 filed Apr. 12, 2012 (8 pages).

* cited by examiner

*Primary Examiner* — Rginald Renwick
(74) *Attorney, Agent, or Firm* — Pillsbury Winthrop Shaw Pittman, LLP

(57) ABSTRACT

A primary game controller for use by a mobility impaired person by interfacing with a peripheral controller that allows the user to input precise movements needed for certain game functions. The peripheral controller may be operated by a part of a user's body in which the user has sufficient motor control, while the primary game controller may provide control inputs that require lesser motor control to operate. A control unit on the game controller may transmit control signals from the game controller and the peripheral controller, or may exclusively use the peripheral controller as the input for certain game functions. The game controller may be sized to be able to rest on a user's lap and to provide bigger control inputs.

20 Claims, 10 Drawing Sheets

GAME CONTROLLER ADAPTED FOR USE BY MOBILITY IMPAIRED PERSONS

CROSS REFERENCE TO RELATED APPLICATIONS

This application claims priority to U.S. Provisional Patent Application Ser. No. 61/474,738, filed on Apr. 12, 2011, the entire content of which is incorporated herein by reference.

FIELD OF THE INVENTION

The invention relates to a game controller adapted for use by a mobility impaired person.

BACKGROUND

Mobility impairment, such as quadriplegia, may deprive a user of full use of his or her limbs and torso. For example, a user may have a limited amount of motor control in his or her fingers, hands, or arms. The causes of mobility impairment, such as spinal injury, may also leave the user with chronic physical or psychological pain. The mobility impairment may also limit users' ability to engage in activities that may focus their attention away from their pain.

Although video games may provide a high level of enjoyment and capture the concentration of their users, traditional game controllers have joysticks and small buttons that require precise motor control in a user's hand to manipulate. Control inputs, such as joysticks or buttons, on the controller are manipulated by the user's hands to provide input to the game. For example, to aim a weapon in a game, a joystick or other directional control input may need to be manipulated by one hand to input an aiming command that directs a crosshair in finely tuned movements toward a target in the game, and firing of that weapon may be done by pressing a button. A control input like the joystick may output control signals to the game with a high level of precision, but requires precise movements to operate. Such precise movements for gaming functions like aiming requires a certain degree of manual dexterity in the user.

Mobility impaired users who have limited motor control of their hands, find traditional game controllers inconvenient or difficult to use.

SUMMARY

According to an aspect of this invention, there is provided a game controller for use by a mobility impaired person. The game controller comprises a first control input configured to generate a first control signal based on user input, a communication interface configured to receive a second control signal from a peripheral controller, and a control unit configured to select the first control signal and second control signal for transmission to a remote game console. The first control input on the controller may be, for example, a button that can be pressed by a user's hand to generate a shoot command or a joystick that may be pushed by the user's hand to generate a command to move forward or some other directional movement input. The peripheral controller may be, for example, a chin stick that may be manipulated by precise chin movements of a user to generate aiming commands in a game. Another peripheral controller, such as a motion sensor attached to a user's leg, may generate movement commands based on a sensed motion of the leg.

The game controller's communication interface may communicate with the peripheral controller through a wireless data connection or through a port that connects to an electrical connector of the peripheral controller.

The game controller may further comprise a second control input that generates a control signal serving the same game function as the peripheral controller's signal. For example, a joystick or button on the game controller may generate movement commands, while a motion sensor attached to a user's leg may also generate movement commands. The control unit of the game controller may select between which of the two movement command signals to transmit to a remote game console. For example, the control unit may choose to transmit the control signal from the joystick on the game controller if no control signals are being received from the motion sensor. To detect whether a signal from the motion sensor is being received, the control unit may detect whether an electrical connector of the motion sensor is unplugged from the game controller or whether a wireless connection with the motion sensor is not established. In another example, the control unit may choose to transmit the control signal from the motion sensor if an electrical connector of the motion sensor is plugged into a port on the controller or if a wireless connection with the motion sensor is established.

According to an aspect of this invention, there is provided a game controller system comprising a primary controller and a peripheral controller. The primary game controller comprises a first control input that is configured to generate a first control signal and a second control input that is configured to generate a second control signal based on user input, such as manipulation by a user's hands. The peripheral controller may generate a third control signal based on user input from another part of the user's body, such as his or her head, neck, arms, elbow, legs, or torso.

The peripheral controller may generate a control signal that serves the same game function as the signals generated by the first and second control inputs on the primary game controller. The peripheral controller may alternatively generate a control signal that serves a different or complementary game function as the control signals from the primary game controller. The peripheral controller may transmit its generated control signal to the primary controller. If the control signals from the primary controller and peripheral controller serve different game functions, the control unit on the primary controller may transmit all three control signals to a remote game console. For example, if a primary controller comprises a joystick and button that generate signals for a movement function and shooting function while a chin stick generates signals for an aiming function, the control signals for all three functions may be transmitted to a console executing the game. If the control signals from the primary controller and peripheral controller serve the same or overlapping game functions, the control unit may be configured to select between the control signals. For example, if the primary controller comprises a joystick that generates signals from a directional movement input for a movement function while a chin stick also generates signals for a movement function, only one of the signals may be useful. In one example, the control unit may select the control signal from the peripheral controller if the peripheral controller has a data connection with the primary controller. A data connection may be detected based on the presence of a wireless connection with the peripheral controller or on the presence of an electrical connector at a port of the primary controller. In one example, if no wireless connection or electrical connector of the peripheral controller is detected, the control unit may select the control signal generated by the primary controller for transmission to the remote game console.

According to an aspect of the invention, there is provided a method of generating game control signals, comprising generating a first game control signal based on user input received at a first control input of a primary controller and generating a second game control signal based on user input received at a second control input of the primary controller. The method further comprises detecting whether there is a data connection with a peripheral controller. If there is no data connection, the first and second control signals are transmitted to a remote game console. If there is a data connection, a third control signal is received from the peripheral controller. The game function of the third control signal is compared with the game function of the first and second control signals. If the third control signal has the same game function as that of the first or second control signal, the third control signal instead of that first or second control signal may be transmitted to the game console. If the third control signal does not have the same game function as that of the first or second control signal, all three control signals may be transmitted.

According to an aspect of the invention, there is provided a game controller that may be rested on a user's lap. The game controller may comprise a top surface configured to receive one or more control inputs, such as buttons, joysticks, or triggers. The game controller may comprise a bottom surface comprising a first curved recess, a second curved recess, and a planar region between the two curved recesses. The curved recesses may be shaped to fit over a user's legs. One side of the game controller, such as its rear side, may also be curved like the middle of a crescent shape. The shape may allow the controller to engage a user's abdomen.

According to an aspect of the invention, there is provided a peripheral controller for manipulation by a user's chin. The peripheral controller comprises a housing and a control input pivotably connected to the housing and configured to generate a control signal based on a user input. The peripheral controller further comprises a flexible, self-supporting structure, such as a tube coupled to the housing and having a flexible core. The flexible core may be malleable enough to be bent into one or more contours, but rigid enough to maintain its contour during game play. The peripheral controller further comprises a fastening device coupled to the flexible, self-supporting structure.

These and other aspects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
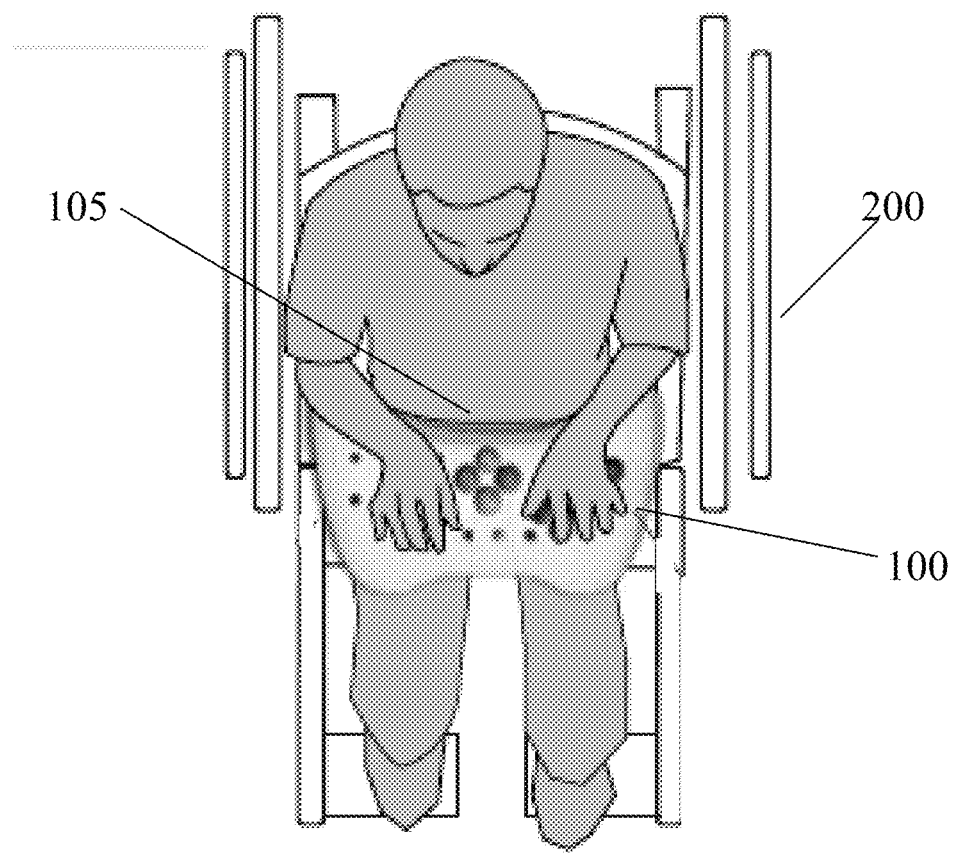
FIG. 1 illustrates a game controller adapted for use by a mobility impaired person.

FIG. 1 illustrates one embodiment of a game controller 100 adapted for use by a mobility impaired user. The large surface of the game controller 100 relieves a user from having to hold the controller with just his or her hands, and instead allows the controller 100 to rest on the user's lap. Because the surface is large enough for the user to rest his or her hands on the controller, the user's arms or hands are less likely to tire during long periods of game play. A curved region 105 on the back side of the controller may have a contour that receives or hugs the abdomen of the user. The curved region 105 may create a fit around the user so that the controller 100 is more stable and does not shift sideways (i.e., in the lateral direction) during game play, allowing the user to use the controller 100 in a sitting or semi-reclined position.

The large surface of the game controller 100 may also allow bigger control inputs, such as buttons, to be installed on the controller 100. A control input refers to any device that may receive a user input and generate a control signal. Examples of a control input include, but are not limited to, buttons, joysticks, triggers, steering wheels, switches, paddles, or any combination thereof. It may be more convenient for a mobility impaired user to press individual buttons that have larger surface areas or that are spaced farther apart. It may be more convenient for a user to manipulate a joystick, for example, that is big or tall enough to be manipulated or pushed by a user's hand.

The game controller is not limited to the size shown in these embodiments, but may take any size that allows the controller's surface to receive control inputs that are large enough to be easily reached by a user with a mobility impairment. For example, the game controller 100 of FIG. 1 may be sized relative to the size of a wheelchair 200. Some wheelchair manufacturers, for example, produce adult-sized wheelchairs with a standard seat width of 18 inches and child-sized wheelchairs with a standard seat width of 10 to 16 inches. For this example, the game controller 100 may be provided at two lateral widths, one sized to fit a user of a wheelchair with an 18 inch seat and one sized to fit a user of a wheelchair with a 10 to 16 inch seat. The lateral width of the game controller 100 may be based on other metrics of a wheelchair, such as a standard distance between arm rests. The lateral width of the game controller 100 may be based on metrics of other standards, such as ergonomic standards, furniture standards, building codes, or any combination thereof.

Figure 2A:
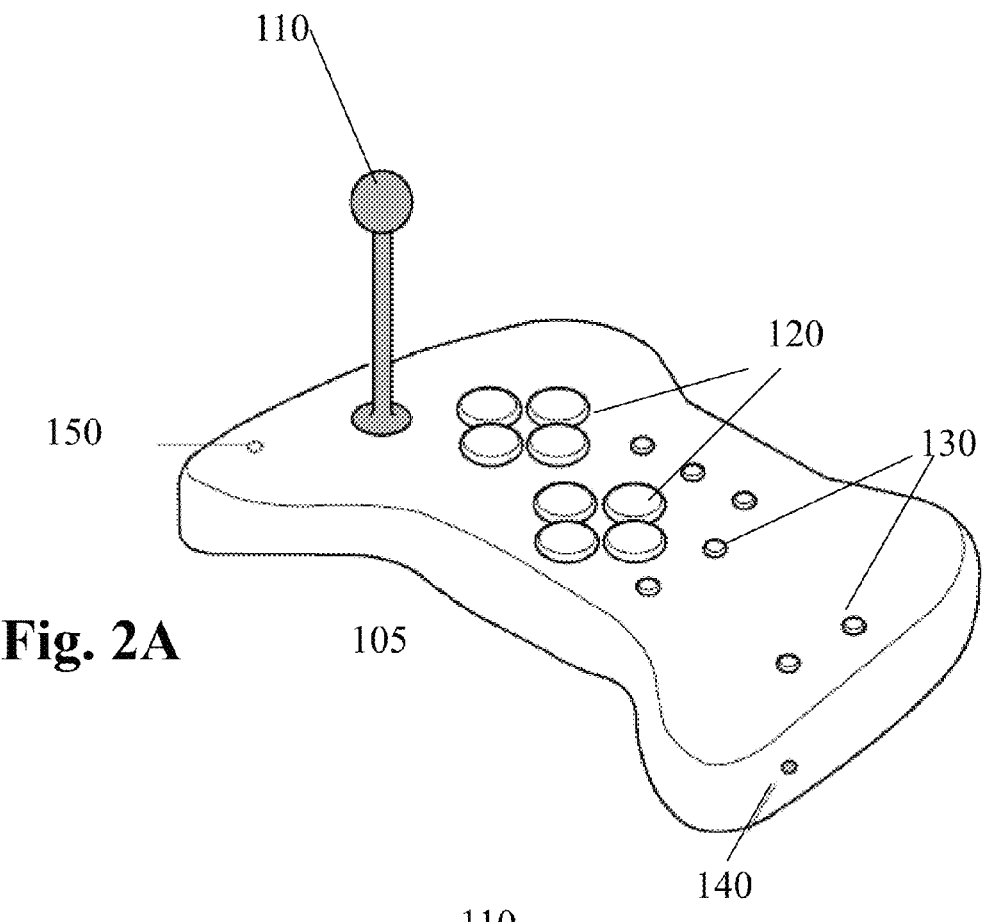
FIG. 2A illustrates a perspective view of a game controller adapted for use by a mobility impaired person and its components.
Figure 2B:
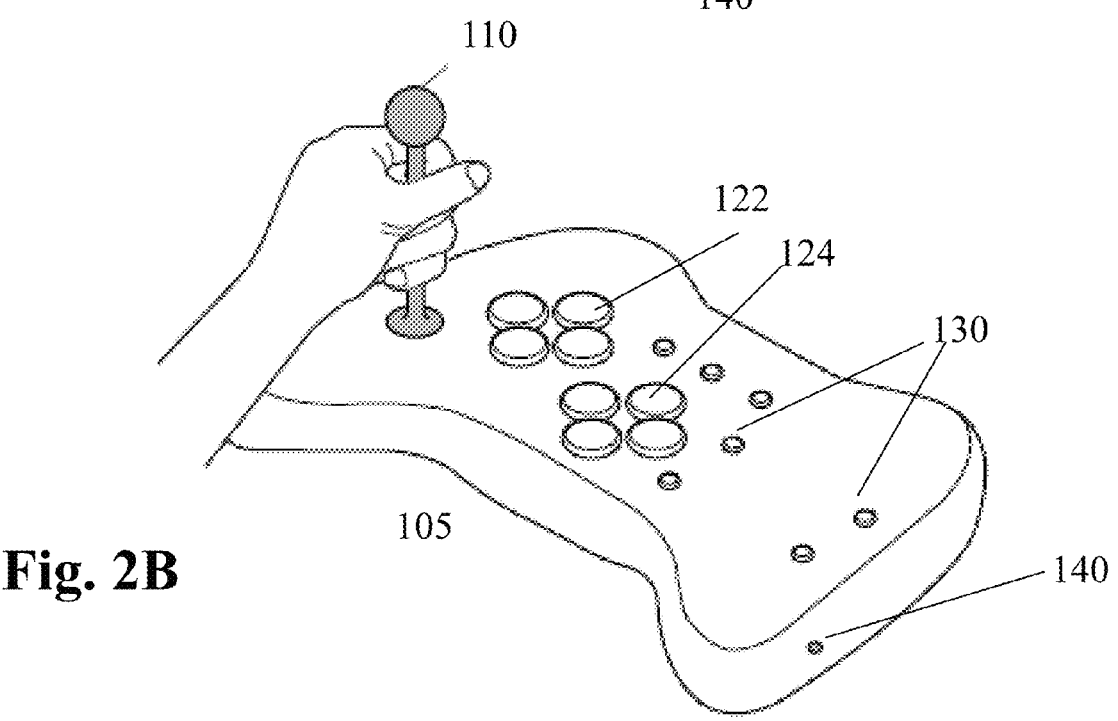
FIG. 2B illustrates another view of the game controller of FIG. 2A.

Control inputs such as a joystick 110 and buttons 120, 130 of the game controller 100 are shown in FIG. 2A and FIG. 2B. The joystick 110 may receive a directional movement input, such as a push on the joystick that pivots it toward a direction in the plane of the controller surface, and may generate a control signal to move in a corresponding direction in the game.

The joystick 110 may output signals to the controller 100 through an electrical connector that is connected to a port 150 of the controller. For example, the joystick 110 may include a TRS connector, an Ethernet connector, a USB connector, a D-sub connector, or any combination thereof. The joystick's 110 connector may be plugged into the port 150 to transmit signals to the controller 110. A port refers to any electrical component, such as a socket or jack, configured to receive insertion of an electrical connector. The port 150 may be part of a communication interface on the controller 100. For example, the port 150 may be part of a general peripheral control input communication interface that accepts connectors from peripheral control inputs, such as a chin stick or motion sensor. The communication interface may accept a connector from the game controller's joystick 110 by treating it as a peripheral input. FIG. 2A shows another port 140 that may also be part of the general peripheral control input communication interface.

The ports 140, 150 in the communication interface may be dedicated to joysticks and similar control inputs. For example, in a game that may require two joystick control inputs, the two ports 140 and 150 may each be connected with a different joystick control input. A connector from joystick 110, for example, may be plugged into port 140 or port 150. A second joystick may be installed on the right side of the controller 100. In that example, a user may need to use his or her right hand to simultaneously manipulate the joystick and hit buttons on the right side. Because the surface of the controller 100 may be large, with control inputs spaced far apart, a user may find it difficult to simultaneously reach a joystick and buttons on the controller. Alternatively, the second joystick control input may be a peripheral controller, such as a chin stick, that plugs into port 140 or 150. Using a chin stick that plugs into the port 140, for example, may free the right hand to hit buttons 124 on the controller 100 without needing to simultaneously reach for a joystick.

A user may choose the game function of a joystick control input by plugging it into either port 140 or 150. For example, port 150 on the left side of the controller may be associated with an aiming function that may be controlled by a joystick, while port 140 on the right side may be associated with a movement function that may be controlled by another joystick. Plugging the joystick 110 connector into port 150 may assign it as the control input used to provide aiming commands to a game, while plugging the joystick 110 connector into port 140 may assign it as the control input used to provide movement commands to the game. The user may also choose the game function of a peripheral controller like a chin stick by plugging it into port 140 or 150. For example, plugging a chin stick into port 150 may assign the chin stick to provide aiming commands to the game, while plugging the chin stick into port 140 may assign it to provide movement commands to the game.

By choosing where to plug the joystick 110 or a peripheral controller, a user may reconfigure the game function of the control inputs on the controller 100 and of the peripheral controller to adapt them to his or her mobility impairment. For example, a user with sufficient motor control in his or her left hand to provide aiming movements may assign the aiming function to joystick 110, which is on the left side of the controller, by plugging the joystick's 110 connector to port 150. A user with limited motor control in his or her left hand or in both hands may assign the aiming function to a chin stick by plugging a chin stick connector to port 150. In that example, the user may use the joystick 110 for movement functions by plugging the joystick 110 into port 140.

A user may also reconfigure the game function of control inputs to relieve a body part that is becoming fatigued. For example, a user whose left hand is tiring from constant aiming movements may rest his or her left hand by switching the control input for the aiming function to a peripheral controller like a chin stick. In that example, the user may unplug the left joystick 110 from port 150, into which a connector from the chin stick may be plugged. The user may reconfigure the left joystick 110 as a control input for movement commands, which may be less tiring than aiming, by plugging the connector of the joystick 110 into port 140. Alternatively, a user may use a second peripheral controller, such as a motion sensor attached to his or her leg, to control the movement function. In that example, a connector from the motion sensor may be plugged into port 140. A user may use the two peripheral controllers to adapt the controller 100 and peripheral controllers to his or her mobility impairment. For example, a user with no motor control in his or her left hand, or a user who may be an amputee who lost his or her left arm, may not be able to use joystick 110. In that example, the users may instead use a motion sensor or chin stick in place of the joystick 110 by plugging the motion sensor or chin stick into port 150. The users may use a second peripheral controller by plugging it into port 140.

Figure 2C:
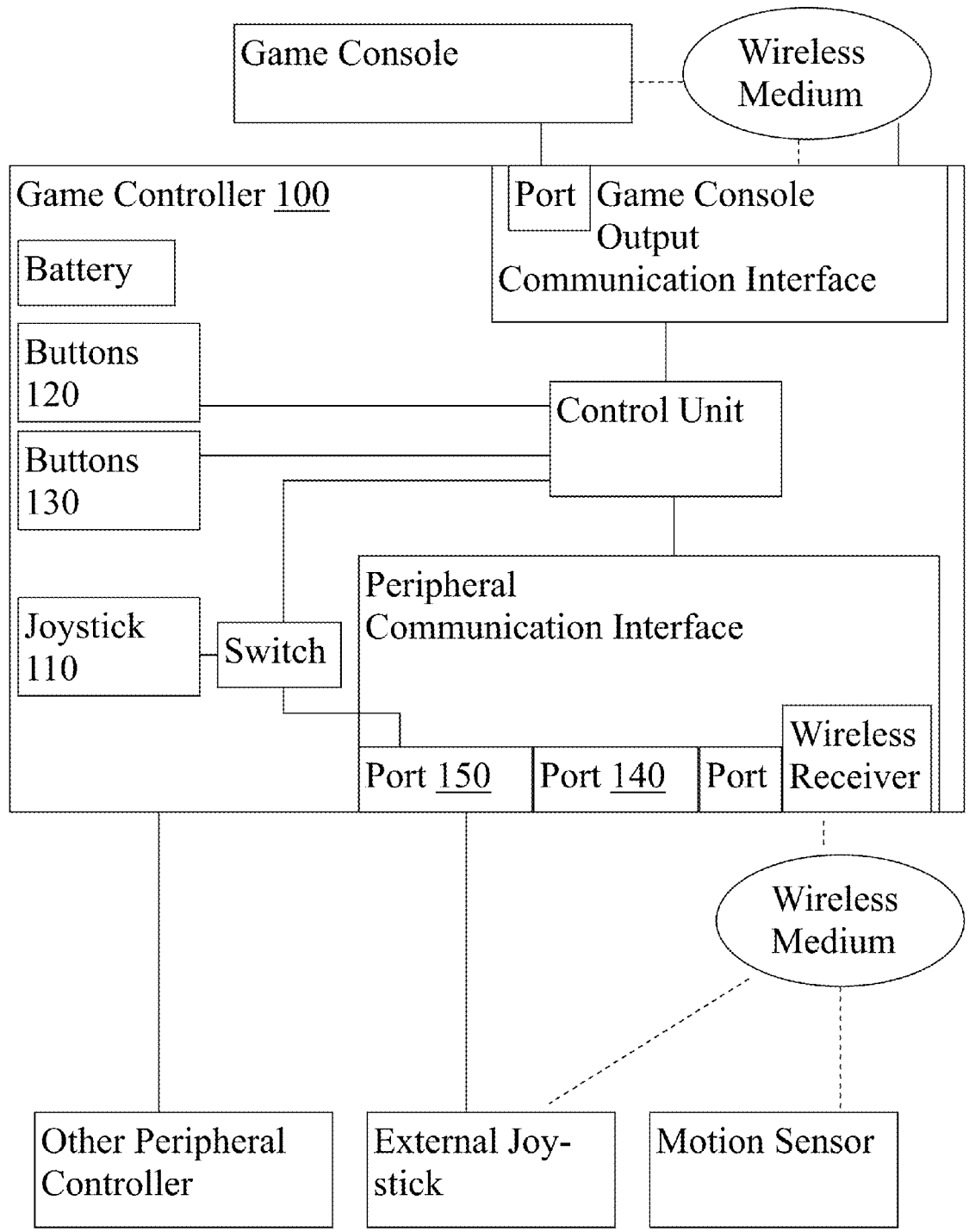
FIG. 2C illustrates some components of an embodiment of the game controller.

In some embodiments, a user may reconfigure the game function of control inputs, like a joystick, on the controller without unplugging the joystick. For example, the joystick 110 may directly output signals to internal electrical connections that relay the signals to control logic inside the controller. Such internal electrical connections may be provided, for example, in a receptacle in which the joystick 110 is installed. In that embodiment, the joystick 110 may have no external connector. In that embodiment, the port 150 may still be dedicated to a joystick input, and plugging a peripheral controller into port 150 may switch a gaming function from the joystick 110 to the peripheral controller. For example, FIG. 2C shows a block diagram of the game controller 100 and the peripheral control input communication interface. The port 150 in FIG. 2C may transmit control signals from a chin stick, for example, into a switch that then blocks the control signals from the joystick 110 and instead relay control signals from the chin stick. If no chin stick is plugged into port 150, the switch may instead relay control signals from the joystick 110. A user may choose to use a peripheral controller instead of the game controller joystick 110 by plugging the connector of the external joystick into port 150.

The controller 100 may also provide switching inputs to reconfigure the gaming functions of control inputs and peripheral controllers. For example, the controller 100 may have a toggle switch or button that may assign a different function to the joystick 110 and a peripheral controller connected to the controller 100. A joystick 110 previously used for aiming may be reassigned to a movement function, while a motion sensor used for movement may be reassigned to an aiming function. In that example, the peripheral controller and the joystick 110 may not need to be unplugged from a port. In that example, the joystick 110 may have no external connector to unplug.

The ports 140 or 150 may be located anywhere on the controller's 100 surface, and may be associated with different game functions. For example, port 150 may be associated with a movement function, and port 140 may be associated with an aiming function. The game functions associated with the ports may be preprogrammed, dynamically assigned, or any combination thereof. The controller may have more ports. For example, a user may wish to use the joystick 110 as well as a chin stick and motion sensor. The controller may have three, four, or more ports to accommodate a plurality of peripheral controllers. The controller may also include a wireless, receiver in a peripheral control input communication interface that establishes wireless data connections with a plurality of peripheral controllers.

The data connection between the peripheral control inputs and the peripheral control input communication interface may be a wired or a wireless connection. For example, a peripheral communication interface on the controller 100 may include a Bluetooth® wireless receiver to communicate with a motion sensor. A button on the controller 100 may be used to establish the wireless data connection with the motion sensor. If the user wished to switch the game function of the motion sensor to a chin stick, the same button or a different button on the controller may allow the user to terminate the wireless data connection with the motion sensor. The user may move the motion sensor out of wireless range or may disable the wireless function of the motion sensor. The user may then establish a wireless data connection with the chin stick.

FIG. 2B shows a user interacting with the joystick 110 of the controller 100. The joystick 110 may have ergonomic features such as a foam grip or curved recesses that fit around a user's fingers. The joystick 110 may be configured to pivot in any direction in the plane of the controller surface, or may simply pivot forward and backward with one degree of freedom. Other control inputs, such as triggers or buttons, may also be attached to the joystick 110.

FIGS. 2A and 2B show controller buttons in a plurality of sizes. A first set 120 of larger buttons may be provided for movement or action inputs. Four of the buttons 122, for example, may control movement in a forward, backward, left, and right directions, respectively, in a game's virtual environment. Another four buttons 124 of the set 120 may control actions for crawling, ducking, parrying, and shooting, respectively, in the game's virtual environment. A second set 130 of smaller buttons may be provided for higher-level game functions, such as starting, ending, or pausing a game. Because the buttons in the second set 130 are smaller, they may also be spaced farther apart for easier access. The game functions of the control signals generated by the buttons 120, 130 may overlap with those of other control inputs. For example, both the joystick 110 and buttons 122 may control movement, or both the joystick 110 and buttons 124 may control shooting in the game environment. In that example, the control unit may transmit movement control signals from only the joystick or transmit shooting control signals from only the buttons 124.

Figure 3A:
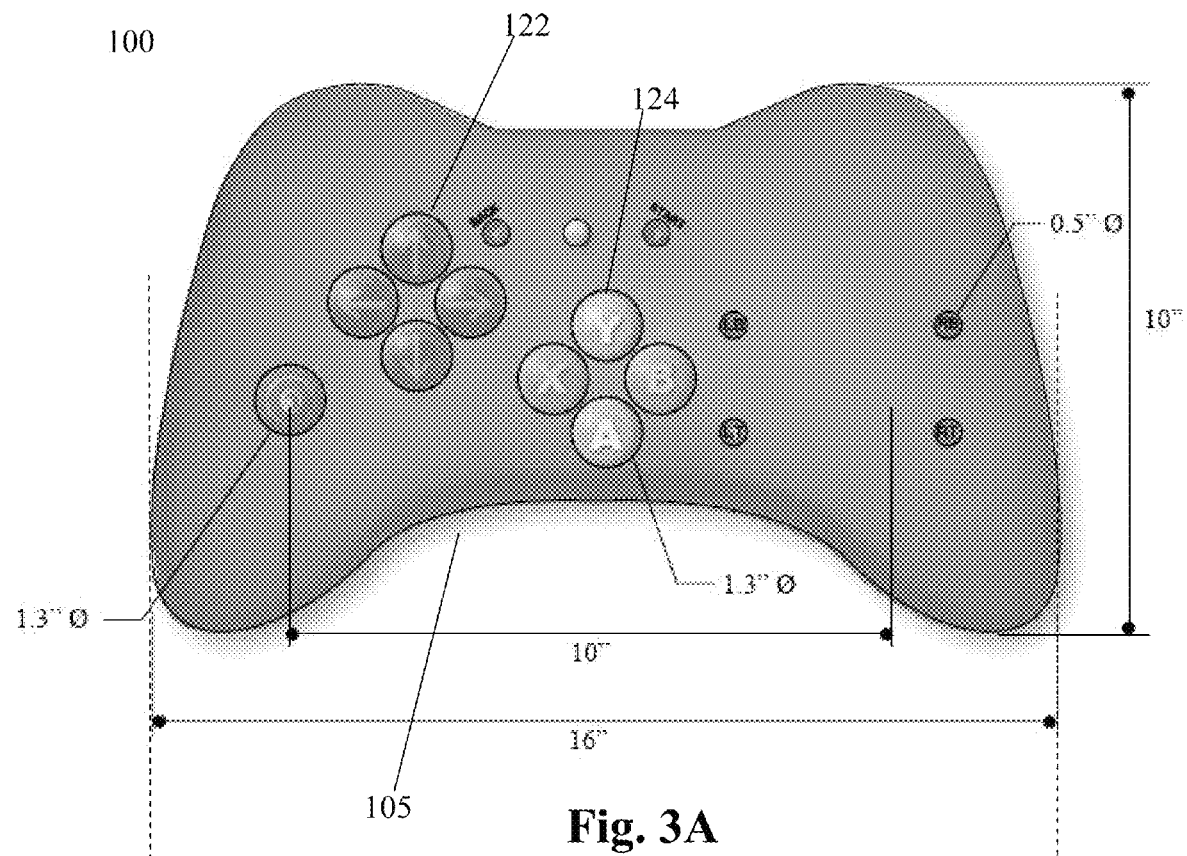
FIG. 3A illustrates a top view of a game controller adapted for use by a mobility impaired person.

The functions of the buttons 120, 130 may also be simplified. For example, four of the buttons 124 in the first set 120 may serve the same function. Rather than having to hit an individual button, a user may hit any combination of the four buttons 124 to generate, for example, a command to shoot, thrust, or throw a weapon in the game. The example of movement buttons 122 and action buttons 124 is also shown in FIG. 3A. In FIG. 3A, the A, B, X, Y buttons 124 may generate control signals for four separate functions in the game. Alternatively, the four buttons may generate control signals for the same function, so that a user may input an action command by hitting any combination of the A, B, X, Y buttons 124.

FIG. 3A also shows a top view of the game controller 100. The figure shows the curved region 105 that is recessed for the entire height of the controller body to fit the rear side of the controller against a user's abdomen, hip, or another region of the torso. The curve of the region 105 may resemble the middle of a crescent shape. The middle of a crescent shape may refer to any shallow, recessed curve that may fit the contour of the controller around a user's torso. The region 105 may also have a more general concave shape. The concave shape may approximate the contour of a user's torso with a more general curve or with straight lines. For example, the region 105 may use straight lines to create a recessed contour that appears like the top of a trapezoid.

Figure 3B:
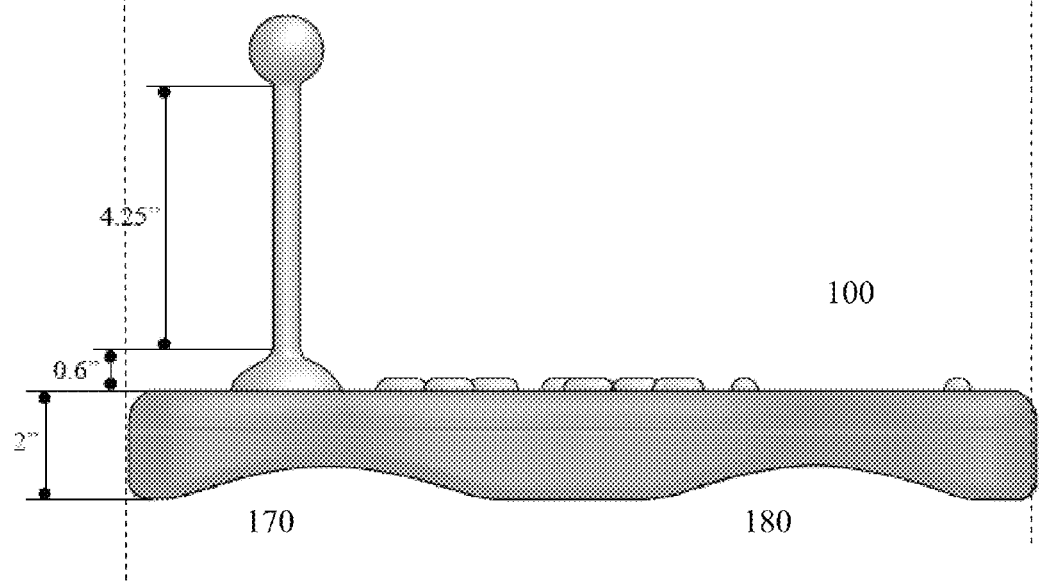
FIG. 3B illustrates a back view of the game controller of FIG. 3A.

By way of example, the recess 105 may have a fore-aft length between 2 inches and 24 inches, or between 3 inch and 14 inches, with a specific example of 10 inches. Curved regions that may fit the controller on a user's legs are shown in FIG. 3B, which extend preferably in the entire fore-aft direction of the controller 100. The curved regions include a curved recess 170 and curved recess 180 may each be shaped to increase the surface contact area between the controller's 110 bottom surface and a user's legs. The increased surface contact area created by the curved recesses 105, 170, 180 may enhance the stability of the game controller 100 during game play. The extra contact makes the controller 100 less likely to shift sideways and less likely to slide off the user's lap during game play. The curved recesses 170 and 180 may also have a more general concave shape, such as with interconnected flat walls. By way of example, each of the curved recesses 170, 180 may have a lateral width that is between 2 inches and 10 inches, or between 3 inches and 9 inches, with a specific example of 6 inches. Also by way of example, each of the curved recesses 170, 180 may have a fore-aft length that is between 2 inches and 10 inches, or between 4 inches and 8 inches, with a specific example of 6 inches.

Figure 3C:
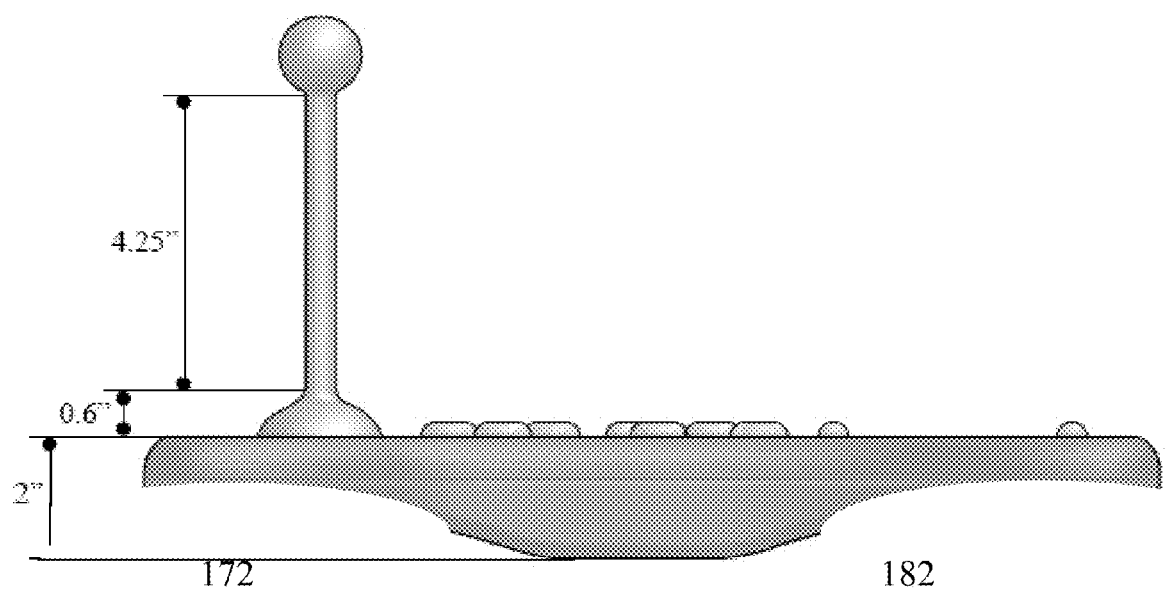
FIG. 3C illustrates an alternative contour of the game controller.

FIG. 3C shows an embodiment with recesses 172 and 182 for receiving a user's legs. The recesses preferably extends in the fore-aft direction of the controller 100. The recesses may increase the surface contact area between the controller and the user's legs or thighs so that the controller is less likely to shift sideways and less likely to slide off the user's lap during game play. The recesses 172 and 182 may also have a more general shape, such as with interconnected flat walls. By way of example, each of the curved recesses 172, 182 may have a fore-aft depth that is between 2 inches and 11 inches, or between 4 inches and 8 inches, with a specific example of 6 inches. Also by way of example, each of the curved recesses 172, 182 may have a lateral width that is between 2 inches and 11 inches, or between 4 inches and 9 inches, with a specific example of 8 inches FIGS. 3A and 3B also show example dimensions of the game controller. The controller 100 is not limited to the dimensions in FIG. 3A or FIG. 3B and may have dimensions in a plurality of other ranges. For example, the lateral width of the controller 100 may be adjusted to accommodate users of different sizes. By way of example, the recess 105 may have a lateral width between 5 and 24 inches, or between 6 and 17 inches, with a specific example of 16 inches.

The fore-aft length of the controller may be decreased from the 10 inches shown in FIG. 3A or the height decreased from 2 inches to decrease the weight of the controller. The fore-aft length may also be increased to improve surface contact area with a user's legs. The height may also be increased to make the top surface of the controller 110 easier to reach. The joystick 110 may be made longer or shorter to adjust to users with different hand sizes, and smaller or larger buttons 120, 130 may be used.

The control inputs on the controller 110 are not limited to those shown in these embodiments, but may include triggers, switches, steering wheels, trackballs, knobs, keys, touch screens, and touch pads. Virtual control inputs, such as virtual buttons or joysticks, may also be rendered on a touch screen.

The control inputs on the game controller 110 may be manipulated by a user's hands or other body parts. For example, a user may manipulate the joystick 110 with his or her elbow, or may place the controller 110 on the floor and manipulate the joystick 110 and buttons 120, 130 with his or her feet. The user may also manipulate a peripheral controller with body parts like his or her elbow, legs, feet, or head.

The game controller illustrated in the embodiments may be adapted for use from a Microsoft® Xbox® controller and may operate to output the same control signals of a typical Xbox® controller. Those signals and the characteristics used for interfacing with the Xbox® and other such game systems are known and need not be detailed herein.

Figure 4A:
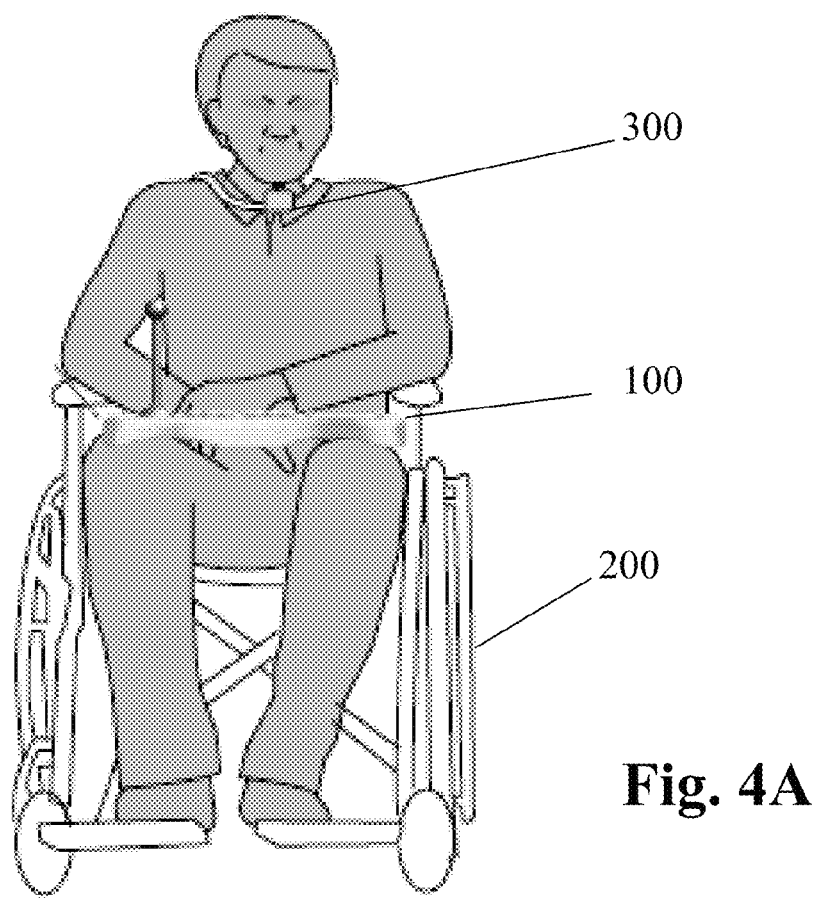
FIG. 4A illustrates a game controller system comprising a peripheral game controller.

FIG. 4A shows an embodiment of a game controller system that uses a chin stick 300 as a peripheral controller. A chin stick refers to any input device that is configured to receive input from a user's chin and to generate a control signal. For a user with limited motor control of his or her hand, the chin stick 300 may allow the user to provide fine motor control through the chin. A chin stick may be configured to generate control signals that an input device like a computer mouse, a keyboard, a button, a joystick, a switch, a trackpad, trackball, or other input device is able to generate. The chin stick may comprise a control input, such as a button, joystick, switch, trackball, or trackpad, to generate such control signals. The chin stick may rely on any structure that holds the chin stick under a user's chin, such as a strap, a self-supporting tube with a flexible core, a bracket, or any other structure configured to support the weight of the chin stick's control input.

The chin stick 300 in FIG. 4A may generate movement control signals based on input received from a user's chin. For example, a user may provide aiming directions, dragging commands, or other functions requiring precise movement to the game by using his or her chin. Functions that require a lesser degree of precision, such as a command to move forward or backward or a command to shoot a weapon or to duck, may still be operated through the joystick 110 or buttons, 120, 130 which may simply be pushed or pressed by a user's hands. The peripheral controller may directly communicate with a game console executing the game, but may instead communicate with the game controller 100, which may relay the control signals from the peripheral controller to the game console.

Figure 4B:
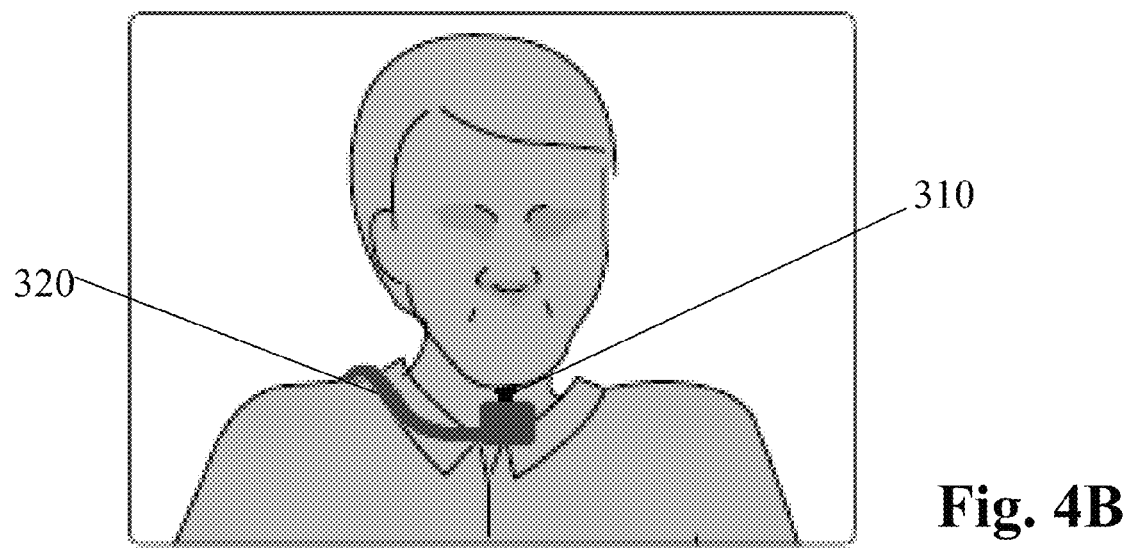
FIG. 4B illustrates a closer view of the peripheral game controller of FIG. 4A.

FIG. 4B shows an embodiment of a chin stick 300 that may use a joystick 310 that is manipulated by a user's chin. The joystick 310 may be mounted on a pivot, hinge, a swivel, or any other connection in a housing that allows the user's chin to provide an input in one or more degrees of freedom. The chin stick 300 is not limited to using a joystick 310, but may use any other device that may be manipulated by the user's chin, such as a trackball, or control inputs that generate less granular outputs, such as a button or switch. Other gaming accessories, such as a microphone, may also be placed on the chin stick 300. The chin stick 300 may be strapped to a portion of the user's body, such as his or her shoulders, neck, or head. The chin stick 300 may also be attached to the game controller 100 or an object around the user, such as a piece of furniture or a wheelchair 200.

Figure 4C:
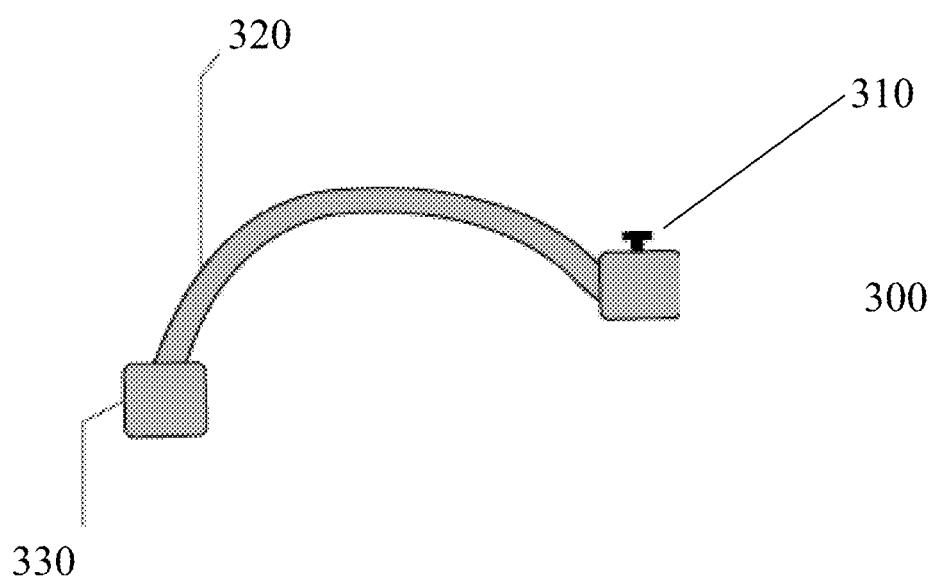
FIG. 4C illustrates a side view of the peripheral game controller of FIGS. 4A and 4B.

A flexible supporting structure 320 may be used to extend the joystick 310 from the point of attachment to the user's chin. In one embodiment, the supporting structure 320 may have the form of a tube with a flexible core. The flexible core may be malleable enough for its contour to be adjusted by the user but rigid enough to maintain its adjusted contour. FIG. 4C shows a closer view of one embodiment of the chin stick 300 that has a clamp 330 for attaching the chin stick 300 to a user's wheelchair 200. A fastener other than a clamp, or a magnet or adhesive may also be used to attach the chin stick 300. The chin stick may be permanently fastened or detachably fastened to the wheelchair or other object around the user. The user may bend the flexible, self-supporting structure 320 so as to position the joystick 310 at the end of the structure 320 to be under the user's chin. The flexible, self-supporting structure 320 may be any material whose contour may be altered by the user but is rigid enough to maintain the altered contour.

Figure 5:
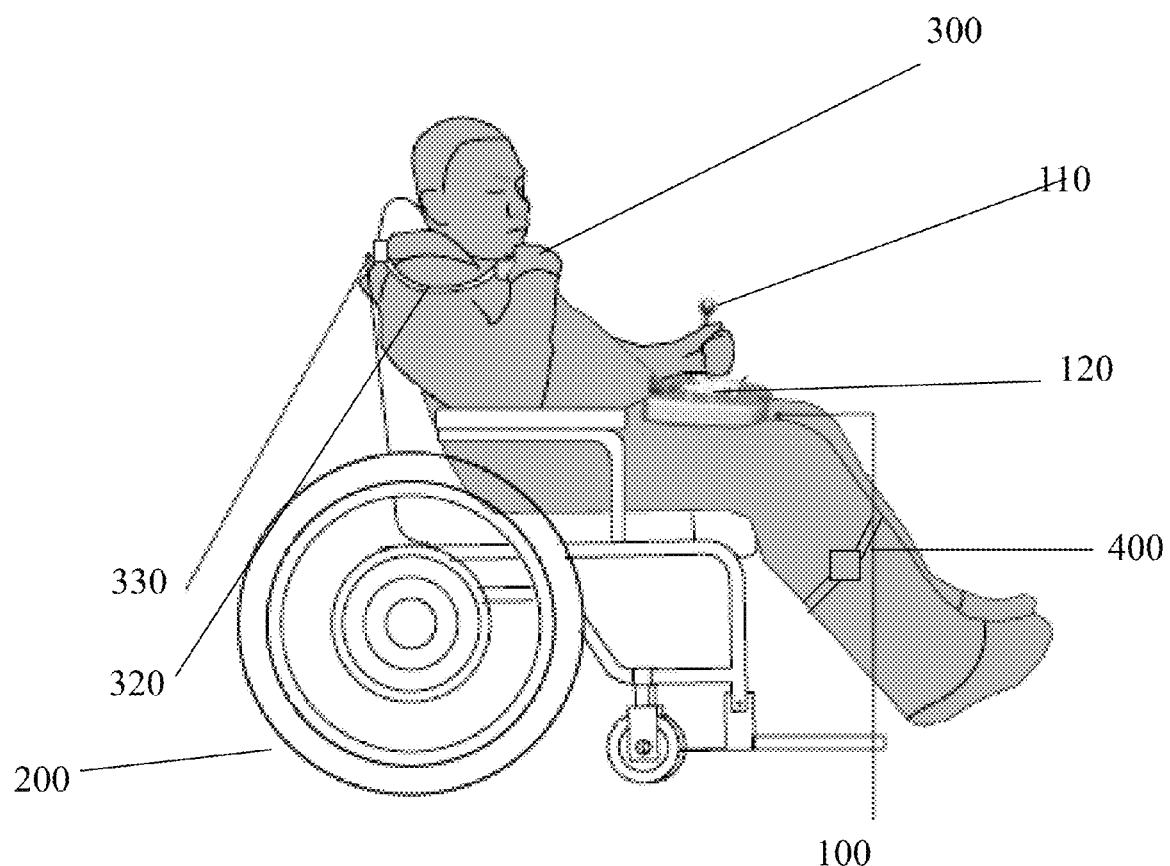
FIG. 5 illustrates a side view of the game controller system of FIGS. 4A and 4B.

FIG. 5 shows the clamp 330 of a chin stick 300 attached to a user's wheel chair 200. The chin stick 300 and controller 100 in FIG. 5 may generate control signals for separate functions. For example, in a first person shooting game, the user may push with his left hand the joystick 110 on the controller 100 to control general directions of movement. The user may manipulate the chin stick 300 to aim the crosshair of his or her weapon in the game. The user may then use his right hand to push the buttons 120 to shoot his or her weapon in the game.

The motion sensor 400 may be attached to other portions of the user's body, such as his or her arms or head. The peripheral controllers are not limited to a chin stick or motion sensor, but may be any device that may convert a force or motion from a portion of the user's body into a control signal. The peripheral controllers may incorporate pressure sensors, potentiometers, gyroscopes, compasses, or any other component configured to sense motion or force. In one embodiment, a peripheral controller may incorporate a pressure sensor into a headrest. The peripheral controller may sense pressure changes from a user's head to generate, for example, control signals to shoot a weapon in a game.

The peripheral controller may communicate with the primary game controller 100, which may control a game console output communication interface to relay control signals from the controller's control inputs and the peripheral controller to a game console executing the game. The game controller's game console output communication interface may communicate with the game console through a wired connection or may communicate wirelessly, such as through a WLAN, infrared, Bluetooth® standard, or any other wireless standard. The game console output communication interface and peripheral control input communication interface may be part of the same communication circuit in the controller and may use the same receiver and transmitter, or may be part of separate communication circuits.

The peripheral controller and game controller 100 may communicate wirelessly, such as through a Bluetooth®, WLAN, infrared, or any other wireless communication standard. As FIG. 2C shows, a peripheral control input communication interface on the controller 100 may have a wireless receiver that may communicate with one or more peripheral controllers, like a motion sensor or external joystick. FIG. 2C shows that the peripheral controller and game controller 100 may communicate through a wired connection via a plurality of ports. The ports may accommodate a plurality of peripheral controller connectors, such as a USB connector, an Ethernet connector, a TRS jack, a RCA connector, EIAJ connector, a D-sub connector, or any other standard or customized connector. A port may be dedicated to a specific type of control input, such as a joystick or similar control inputs, or may be a general purpose port. The control signals received at the ports or wireless receivers may be processed by the controller 100, which then transmits the processed signals to a game console executing a game. The control signals received at the ports or wireless receivers may also be directly transmitted to a game console executing a game. Control signals from control inputs on the controller 100 may also be directly transmitted to the game console, or may be first processed by the controller 100, which may transmit the processed signals to the game console.

Figure 6A:
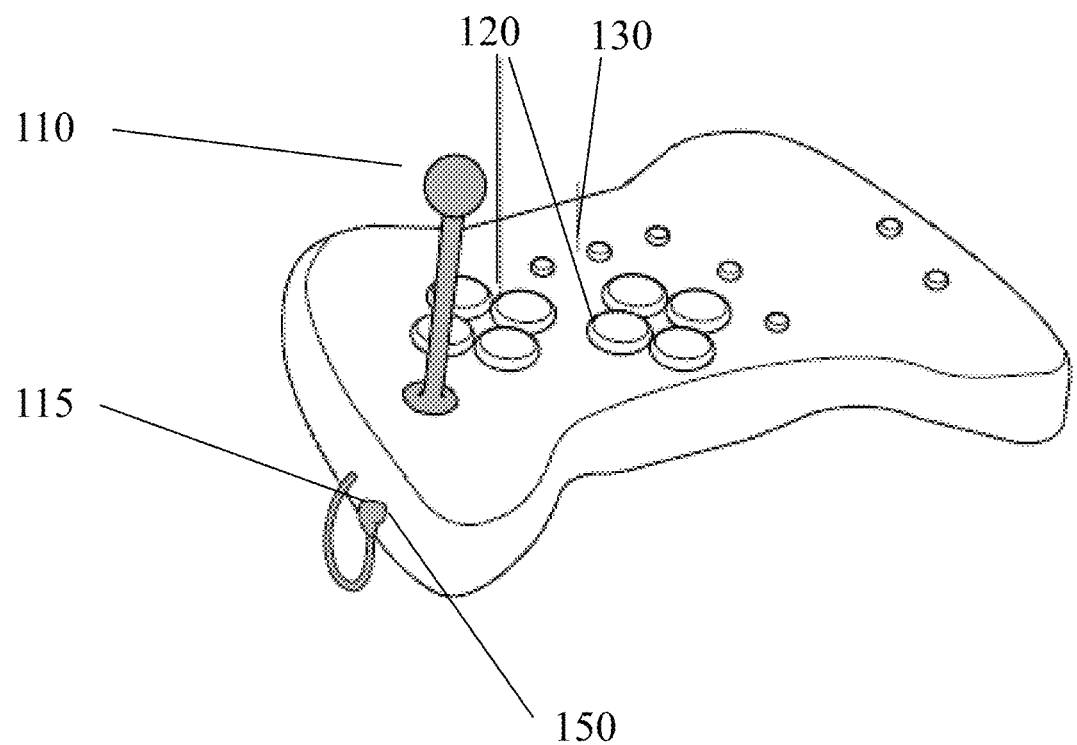
FIG. 6A illustrates a game controller with a joystick connector connected to the game controller.
Figure 6B:
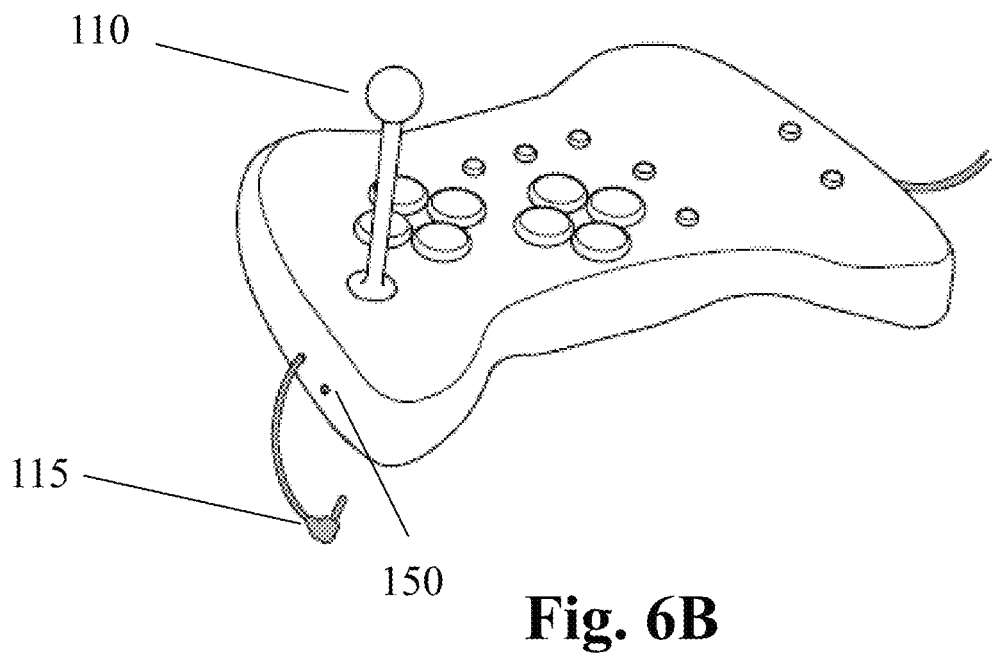
FIG. 6B illustrates the game controller of FIG. 6A with a joystick connector disconnected from the game controller.
Figure 6C:
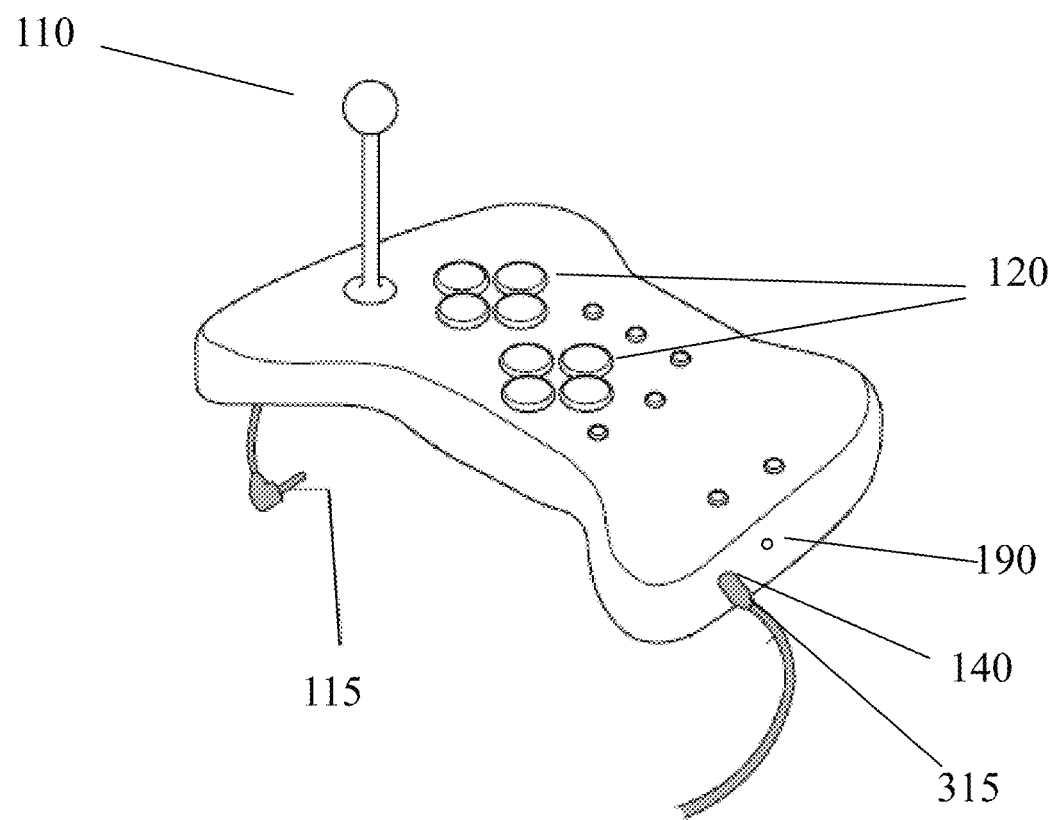
FIG. 6C illustrates the game controller of FIG. 6A with a peripheral controller connector connected to the game controller.

FIG. 6A-C illustrates a connector of a joystick 110 that may be used to switch the game function of the joystick 110. In FIG. 6A, the joystick 110 may generate control signals for a movement function. The control signals may be fed to the controller through internal electrical connections in the joystick receptacle or through an external connector 115 of the joystick that plugs into a port 150 on the controller. The operation of the joystick 110 may be temporarily disabled by unplugging the joystick's connector 115 from the controller 100's port 150, as shown in FIG. 6B. The movement function may be assigned to a peripheral controller, such as a chin stick, by plugging the connector of that peripheral controller to port 150. An aiming function may be controlled by another peripheral controller, such as a motion sensor, by plugging its connector 315 into port 140, as shown in FIG. 6C. A control unit in the controller may simply transmit whatever control signal is received at a port 150 as a movement control signal and transmit whatever control signal is received at port 140 as an aiming control signal. In that example, the joystick 110 connector may remain unplugged, and the joystick 110 is not used in the game. In another example, the joystick 110 may be plugged into port 140 to control the aiming function.

The data connection between the peripheral controller and the game controller 100 may also be wireless. For example, the control unit of the game controller 100 may decide to transmit control signals from the chin stick 300 to the a peripheral control input communication interface on the controller 100 based on a Bluetooth® connection with a Bluetooth® receiver on the controller.

The switching of controls is not limited to just the joystick 110 or chin stick 300, but may involve other control inputs on the controller 100 and other peripheral controllers. For example, while the buttons 124 on the controller may have previously controlled jumping or running functions, a user may switch the function to a motion sensor 400 by plugging a connector of the motion sensor into the port 190 in Fig. C. The port 190 may be preprogrammed or dynamically assigned as the port associated with a jumping or running function.

In some embodiments, the game function of a control input or of a peripheral controller is not fixed, but may be reconfigured. For example, the chin stick 300 may be used as an input for an aiming function for one game or user, and as an input for a movement function for another game or user. The game function that a control input or peripheral controller is assigned to may be uploaded to the control unit. For example, a user profile may be uploaded, and a control unit may decide to assign a left joystick to an aiming function if the user profile indicates adequate motor control in the user's left hand. In one example, the controller 100 may comprise switches or other inputs for selecting which control input or peripheral controller will control a movement function. For example, a user may slide a switch on the controller to toggle between the joystick 110 and a peripheral controller connected to port 140 for the movement function. In another example, the control unit 100 may recognize that tapping buttons 122 a certain number of times will assign it to a shooting function, while moving the chin stick 300 in a certain direction will assign it to an aiming function.

The game function associated with a control input on the game controller 100 or with a peripheral controller may be reconfigured to accommodate a given mobility impaired person's particular needs. For example, for a user with sufficient motor control in his or her left hand but not the right hand, the control unit of the controller 100 may assign the left joystick 110 for game functions, such as aiming, that require high precision movements. For that user, the control unit may assign a movement function, which may require less precise inputs, to peripheral controllers such as the chin stick 300 or motion sensor 400. In another example, for a user with limited motor control in both hands, the control unit on the primary controller 100 may assign the high precision aiming function to a peripheral controller like the chin stick 300. For that user, the control unit may assign the lower precision movement function to the joystick 110 or the motion sensor 400. If that user has almost no motor control in his or her hands, the control unit may assign the movement function to the motion sensor 400 and not use the joystick 110 as a game input.

The functions of the game control signals from the peripheral controllers and the game controller's 100 control inputs may complement each other. For example, one game may use the joystick 110 for controlling a general direction of movement in the game, a motion sensor 400 for accelerating the rate of movement in the game, buttons 122 for adjusting the volume in a game, buttons 124 for directing one or more weapons in the game to be fired, and a chin stick 300 for aiming the one or more weapons. One or both of the chin stick 300 and motion sensor 400 may communicate with the primary game controller 100 wirelessly. Alternatively, a connector 315 from the chin stick may be plugged into port 140, while a connector from the motion sensor 400 may be plugged into port 190. The game controller is not limited to the three ports shown in these embodiments, but may have fewer or more ports. In this example, the control unit may transmit the control signals from all the control inputs on the controller 100 and all the peripheral controllers to the remote game console.

The game controller system described herein makes video games more accessible for mobility impaired persons. By allowing mobility impaired persons to focus their attention on accomplishing intricate tasks in a video game, the system may alleviate or manage the pain caused by their mobility impairment. The system may allow a game user to perform intricate tasks by pairing a game controller with a peripheral controller that may be controlled by a part of the user's body that has a high degree of motor control.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed:
1. A game controller, comprising:
    a controller body having a top surface, a bottom surface, and a peripheral edge between the top surface and the bottom surface;

a first control input on the controller body, configured to generate a first control signal based on user input received by the first control input;

a peripheral control input communication interface on the controller body, configured to receive a second control signal from a peripheral control input device that is separate from the controller body and receives input from a user's chin;

a control unit on the controller body configured to receive the first control signal and second control signal for transmission to a remote game console; and a game console output communication interface on the controller body, connected to the control unit and configured to transmit one or more output signals based on or including the first control signal, the second control signal, or any combination thereof to a remote game console;

wherein the controller body is configured to be received on the user's lap and has a rearwardly facing recess along the peripheral edge for receipt of the user's abdomen to assist in laterally stabilizing the controller on the user's lap, and wherein the peripheral control input device is configured to be positioned on the user's upper body for input from the chin.

2. The game controller of claim 1, the recess having a minimum dimension in a lateral width direction of the controller of at least 6 inches.

3. The game controller of claim 1, the recess having a maximum dimension in a lateral width direction of the controller of at most 18 inches.

4. The game controller of claim 1, the recess having a dimension in a fore-aft depth direction of the controller of at least 2 inches and at most 24 inches.

5. The game controller of claim 1, the recess having a dimension in a fore-aft depth direction of the controller of at least 5 inches and at most 16 inches.

6. The game controller of claim 1, the recess having a dimension in a lateral width direction of the controller of at least 5 inches and at most 18 inches.

7. The game controller of claim 1, the recess having a dimension in a lateral width direction of the controller of at least 8 inches and at most 16 inches.

8. The game controller of claim 1, wherein the one or more control inputs comprises a joystick, a button, a trigger, a switch, a steering wheel, or any combination thereof.

9. The game controller of claim 1, wherein the controller body further comprises a pair of downwardly facing recesses at the bottom surface thereof for receipt of a user's thighs to assist in laterally stabilizing the controller on the user's lap.

10. The game controller of claim 9, wherein each of the downwardly facing recesses has a dimension in the lateral width direction of the controller of at least 5 inches and at most 12 inches.

11. The game controller of claim 9, wherein each of the downwardly facing recesses has a dimension in the fore-aft depth direction of the controller of at least 5 inches and at most 9 inches.

12. The game controller of claim 1, wherein the peripheral control input communication interface comprises a first port associated with a first game function and a second port associated with a second game function.

13. The game controller of claim 12, wherein the first control input comprises a first connector connected to the first port, and wherein the control unit is configured to transmit the first control signal as a control signal for the first game function and to transmit the second control signal as a control signal for the second game function.

14. The game controller of claim 13, wherein the first control input comprises a first connector connected to the second port, and wherein the control unit is configured to transmit the first control signal as a control signal for the second game function and to transmit the second control signal as a control signal for the first game function.

15. The game controller of claim 13, wherein the first control input comprises a first connector that is releasably connectable to the first port and to the second port.

16. The game controller of claim 13, further comprising a third port associated with a third game function.

17. The game controller system of claim 1, wherein the peripheral control input device comprises a chin stick.

18. The game controller of claim 1, wherein the peripheral control input device comprises a joystick that is operable to receive input from a user's chin to generate the second control signal and to move based on the input.

19. The game controller of claim 1, further comprising a second peripheral control input device configured to communicate a third control signal to the peripheral control input communication interface, the second peripheral control input device being separate from the controller body, wherein the control unit on the controller body is configured to receive the third control signal for transmission to the remote game console and wherein the game console output communication interface is configured to transmit one or more output signals further based on or including the third control signal or any combination thereof to the remote game console.

20. The game controller of claim 19, wherein the second peripheral control input device comprises a motion sensor that is operable to generate the third control signal.

* * * * *